(12) United States Patent
Kulkarni et al.

(10) Patent No.: US 10,955,161 B2
(45) Date of Patent: Mar. 23, 2021

(54) PREDICTIVE AIR HANDLING SYSTEM

(71) Applicant: SAP SE, Walldorf (DE)

(72) Inventors: Ninad Kulkarni, Dublin, CA (US);
Xuening Wu, Shanghai (CN);
Sangeetha Krishnamoorthy,
Sunnyvale, CA (US); Mario Ponce,
Santa Clara, CA (US); Jun Meng,
Glenview, CA (US); Rui Jin, Newark,
CA (US); Wafaa Sabil, San Francisco,
CA (US); Sivakumar N, Sunnyvale,
CA (US)

(73) Assignee: SAP SE, Walldorf (DE)

(*) Notice: Subject to any disclaimer, the term of this patent is extended or adjusted under 35 U.S.C. 154(b) by 97 days.

(21) Appl. No.: 16/264,443

(22) Filed: Jan. 31, 2019

(65) Prior Publication Data

US 2020/0248920 A1    Aug. 6, 2020

(51) Int. Cl.
| | | |
|---|---|---|
| *F24F 11/47* | (2018.01) | |
| *G01W 1/10* | (2006.01) | |
| *F24F 11/64* | (2018.01) | |
| *F24F 11/65* | (2018.01) | |
| *F24F 11/77* | (2018.01) | |
| *G05B 13/04* | (2006.01) | |
| *F24F 140/60* | (2018.01) | |
| *F24F 110/10* | (2018.01) | |
| *F24F 110/12* | (2018.01) | |
| *F24F 120/10* | (2018.01) | |
| *F24F 130/10* | (2018.01) | |

(Continued)

(52) U.S. Cl.
CPC ............. *F24F 11/47* (2018.01); *F24F 11/64* (2018.01); *F24F 11/65* (2018.01); *F24F 11/77* (2018.01); *G01W 1/10* (2013.01); *G05B 13/048* (2013.01); *F24F 2110/10* (2018.01); *F24F 2110/12* (2018.01); *F24F 2120/10* (2018.01); *F24F 2130/10* (2018.01); *F24F 2140/50* (2018.01); *F24F 2140/60* (2018.01)

(58) Field of Classification Search
CPC .. F24F 11/47; F24F 11/65; F24F 11/64; F24F 11/77; F24F 2130/10; F24F 2110/10; F24F 2120/10; F24F 2110/12; F24F 2140/60; F24F 2140/50; G01W 1/10; G05B 13/048
See application file for complete search history.

(56) References Cited

U.S. PATENT DOCUMENTS

| | | | |
|---|---|---|---|
| 2010/0286937 A1* | 11/2010 | Hedley ................. | G06Q 50/06 702/60 |
| 2013/0073094 A1* | 3/2013 | Knapton ............... | G05B 13/02 700/278 |

(Continued)

*Primary Examiner* — Thomas C Lee
*Assistant Examiner* — Anzuman Sharmin
(74) *Attorney, Agent, or Firm* — Schwegman Lundberg & Woessner, P.A.

(57) ABSTRACT

Systems and methods are provided for determining a weather forecast corresponding to a location of an air handling unit for a building, generating a foot traffic forecast for a specified time period in the building, and generating a predicted energy consumption curve based on the weather forecast and generated foot traffic forecast for the specified time period. Based on the predicted energy consumption curve, the systems and methods further provide for generating settings for controllable energy devices of the air handling unit to control the air handling unit for the specified time period.

20 Claims, 10 Drawing Sheets

(51) Int. Cl.
*F24F 140/50* (2018.01)
*F24F 11/46* (2018.01)

(56) References Cited

U.S. PATENT DOCUMENTS

2014/0140810 A1\* 5/2014 Balistreri .............. F25B 49/027
  415/1
2014/0316584 A1\* 10/2014 Matsuoka .......... G05D 23/1917
  700/278

\* cited by examiner

PREDICTIVE AIR HANDLING SYSTEM

BACKGROUND

Conventional air handling systems in buildings and residences comprise thermostats that have proportional-integral-derivative (PID) controllers which are reactive techniques for energy management. These systems are reactive because of the PID controller in the thermostat which reacts to an internal temperature of a building crossing a predetermined temperature setpoint by fully turning on a cooling system (for example) or fully turning off the cooling system. This type of reactive technique is not efficient in energy use.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to a predictive air handling system that optimizes cooling and energy consumption for a building to dynamically adjust and manage building environment strategies in real time. As explained above, conventional air handling systems are reactive and thus, if the internal temperature of a building crosses a predetermined temperature setpoint, the cooling mechanisms immediately react to bring the temperature below the setpoint, and then turn off, which is not efficient in energy use. Moreover, these types of reactive systems are not able to incorporate external information, such as outside weather, number of people in the building at any given time, day of the week, and so forth.

In example embodiments, a server system determines a weather forecast corresponding to a location of an air handling unit for a building, generates a foot traffic forecast for a specified time period in the building, and generates a predicted energy consumption curve based on the weather forecast and generated foot traffic forecast for the specified time period. Based on the predicted energy consumption curve, the server system generates settings for controllable energy devices of the air handling unit to control the air handling unit for the specified time period.

Figure 1:
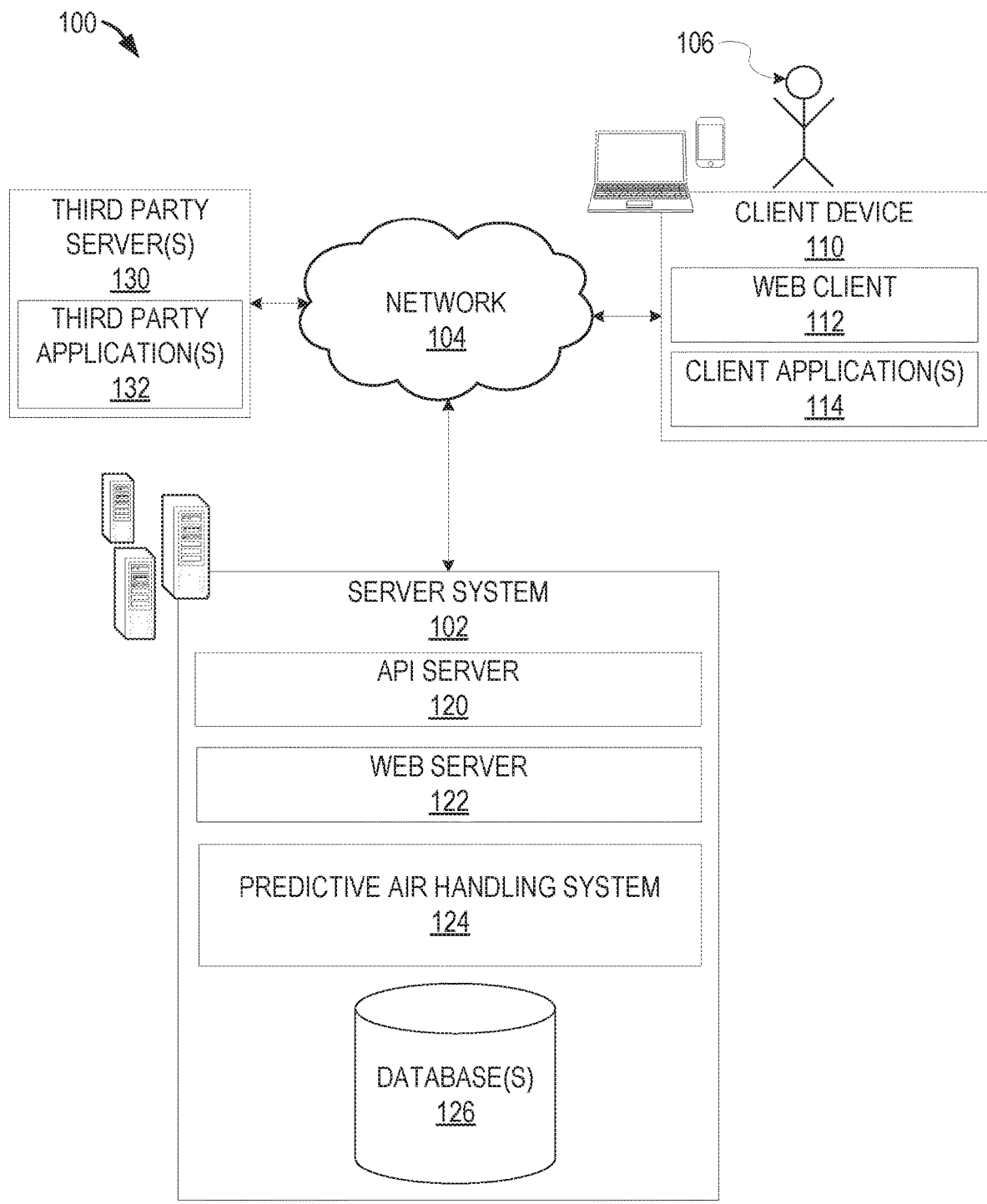
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party servers 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an analytics design application, an air handling system access application, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party servers 130, server system 102, etc.), on an as-needed basis, for data and/or processing capabilities not locally available (e.g., access location information, access software version information, access an ERP system, access a CRM system, access an analytics design system, access data to respond to a search query, to authenticate a user 106, to verify a method of payment, access test data, access an air handling system, etc.). Conversely, one or more applications 114 may not be included in the client device 110, and then the client device 110 may use its web browser to access the one or more applications hosted on other entities in the system 100 (e.g., third-party servers 130, server system 102, etc.).

A server system 102 may provide server-side functionality via the network 104 (e.g., the Internet or wide area network (WAN)) to one or more third-party servers 130 and/or one or more client devices 110. The server system 102 may include an application program interface (API) server 120, a web server 122, and a predictive air handling system 124 that may be communicatively coupled with one or more databases 126.

The one or more databases 126 may be storage devices that store data related to users of the system 100, applications associated with the system 100, cloud services, weather forecast information, holidays and building events, energy consumption predictions, settings for energy devices, settings for an air handling system, and so forth. The one or more databases 126 may further store information related to third-party servers 130, third-party applications 132, client devices 110, client applications 114, users 106, and so forth. In one example, the one or more databases 126 may be cloud-based storage.

The server system 102 may be a cloud computing environment, according to some example embodiments. The server system 102, and any servers associated with the server system 102, may be associated with a cloud-based application, in one example embodiment.

The predictive air handling system 124 may provide back-end support for third-party applications 132 and client applications 114, which may include cloud-based applications. The predictive air handling system 124 provides for determining weather data corresponding to a location of an air handling unit, generating foot traffic forecasts, generating predicted energy consumption curves, generating settings for controllable energy devices of an air handling unit, and so forth, as described in further detail below. The predictive air handling system 124 may comprise one or more servers or other computing devices or systems.

The system 100 may further include one or more third-party servers 130. The one or more third-party servers 130 may include one or more third-party application(s) 132. The one or more third-party application(s) 132, executing on third-party server(s) 130, may interact with the server system 102 via API server 120 via a programmatic interface provided by the API server 120. For example, one or more the third-party applications 132 may request and utilize information from the server system 102 via the API server 120 to support one or more features or functions on a website hosted by the third party or an application hosted by the third party. The third-party website or application 132, for example, may provide control for one or more air handling units that is supported by relevant functionality and data in the server system 102.

Figure 2:
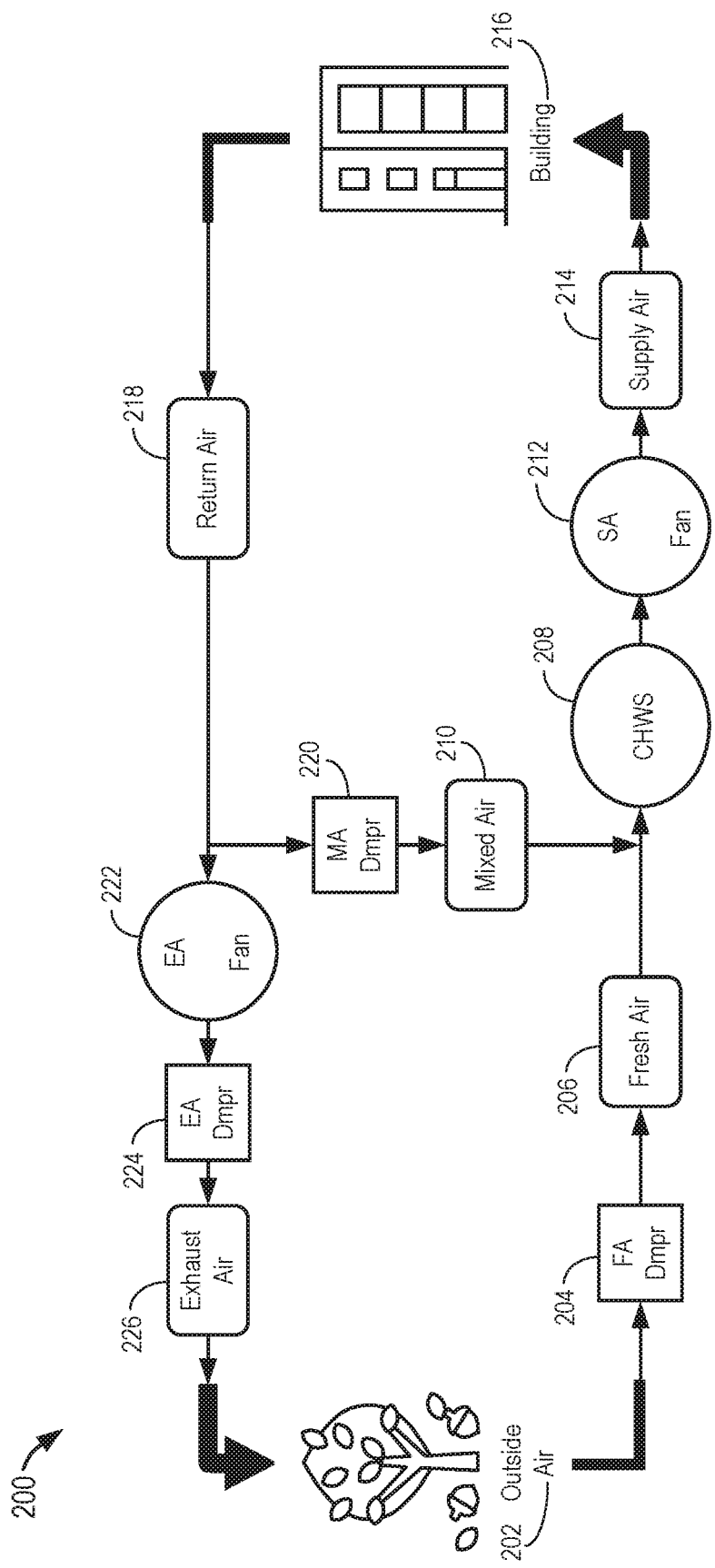
FIG. 2 is a block diagram illustrating an example air handling unit, according to some example embodiments.

FIG. 2 is block diagram illustrating an example air handling unit 200, according to some example embodiments. In this example, outside air 202 comes into the air handling unit 200 though a fresh air damper 204. The outside air 202 is the external air outside of the building. The fresh air damper 204 is a device that controls the rate that outside air 202 is brought into the air handling unit 200 as fresh air 206. Fresh air 206 is the external (outside) air 202 that is pulled from the outside to the inside of the air handling unit 200.

The chilled water supply (CHWS) 208 receives the fresh air 206 and mixed air 210. The CHWS 208 comprises chilled water from which cool air can be generated and a cooling coil valve that controls how much chilled water flows through the system (and how much cooling is generated). The cold water of the CHWS 208 chills the surrounding air, which is then pushed by the supply air fan (SA fan) 212. The SA fan 212 pushes the cool air generated from the cooing coil valve (of the CHWS 208) as supply air 214 for the building 216. The supply air 214 is thus cool air that is supplied from the cooling coil valve. The return air 218 is supply air that is received by the air handling unit 200 after the air has gone through the building 216.

The mixed air damper 220 is a device that controls the mixture of mixed air 210 and fresh air 206 inside the building 216. The mixed air damper 220 generates the mixed air 210 that is supplied to the CHWS 208. Mixed air 210 is a mixture of return air, supply air, and fresh air.

The exhaust air fan 222 is a fan that expels air from inside the building 216 to outside the building 216. The exhaust air damper 224 is a device that controls the rate that the exhaust air fan 222 expels air. The exhaust air 226 is air that is expelled by the air handling unit 200 to outside of the building 216.

In this example, the air handling unit 200 comprises six controllable devices, which include the supply air fan 212, the exhaust air fan 222, the exhaust air damper 224, the fresh air damper 204, the mixed air damper 220, and the cooling coil valve (as part of the CHWS 208). These devices are considered to be controllable devices because they can be controllable by software or other technical means. In other examples, the air handling unit 200 may comprise less, more, or different controllable devices. There may be one or more air handling units 200 in any given building.

These controllable devices can be significant energy consuming devices or non-significant energy consuming devices. Significant energy consuming devices are devices that consume the most energy. The subset of controllable devices that consume the most energy in this example includes the cooling coil valve, the supply air fan 212, and the exhaust air fan 222. Non-significant energy consuming devices are devices that consume the least energy. The subset of controllable devices that consume the least energy in this example includes the exhaust air damper 224, the fresh air damper 204, and the mixed air damper 220. In one example, these dampers 204, 220, 224 are each a mechanical device, such as a flap, that can be opened to allow air flow or closed to stop air flow.

Figure 3:
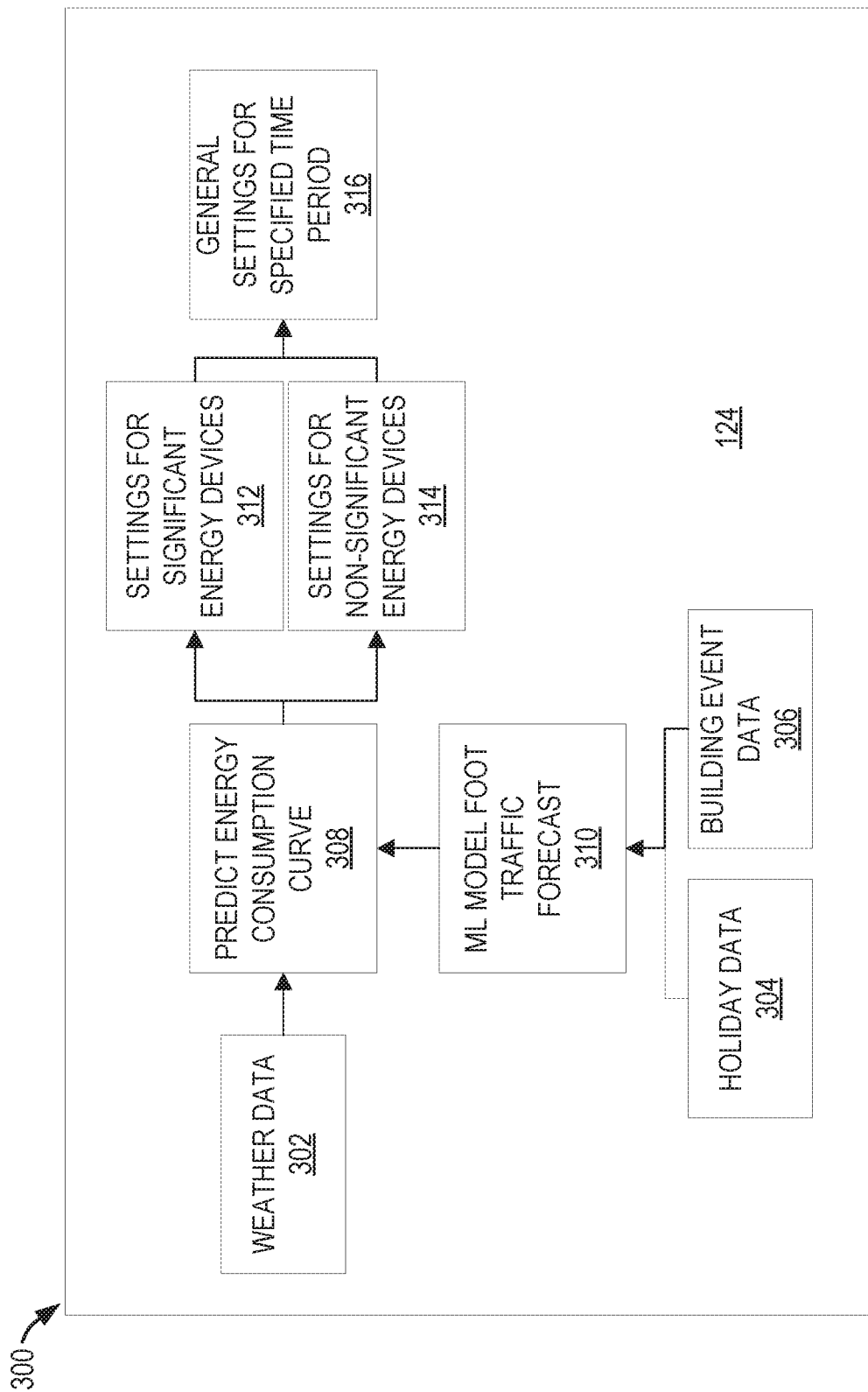
FIG. 3 is a block diagram of an example air handling system, according to some example embodiments.

Example embodiments provide a system that proactively prescribes cooler, fan, and damper settings for an air handling unit (such air handling unit 200). These settings also incorporate external factors such as outside temperature and foot traffic. FIG. 3 is a block diagram 300 of an example air handling system 124. In this example, weather data 302 (e.g., weather forecast data for 24 hours, 36 hours, or other time period) and a machine learning foot traffic forecast data 310 (e.g., generated using external factors such as holiday data 304 and building event data 306) are used to generate or predict an energy consumption curve 308. The energy consumption curve 308 is used to generate general settings for a specified time period 316 for an air handling unit, comprising settings for significant energy devices 312 and settings for non-significant energy devices 314. Further details are described in respect to the flow chart of FIG. 4.

Figure 4:
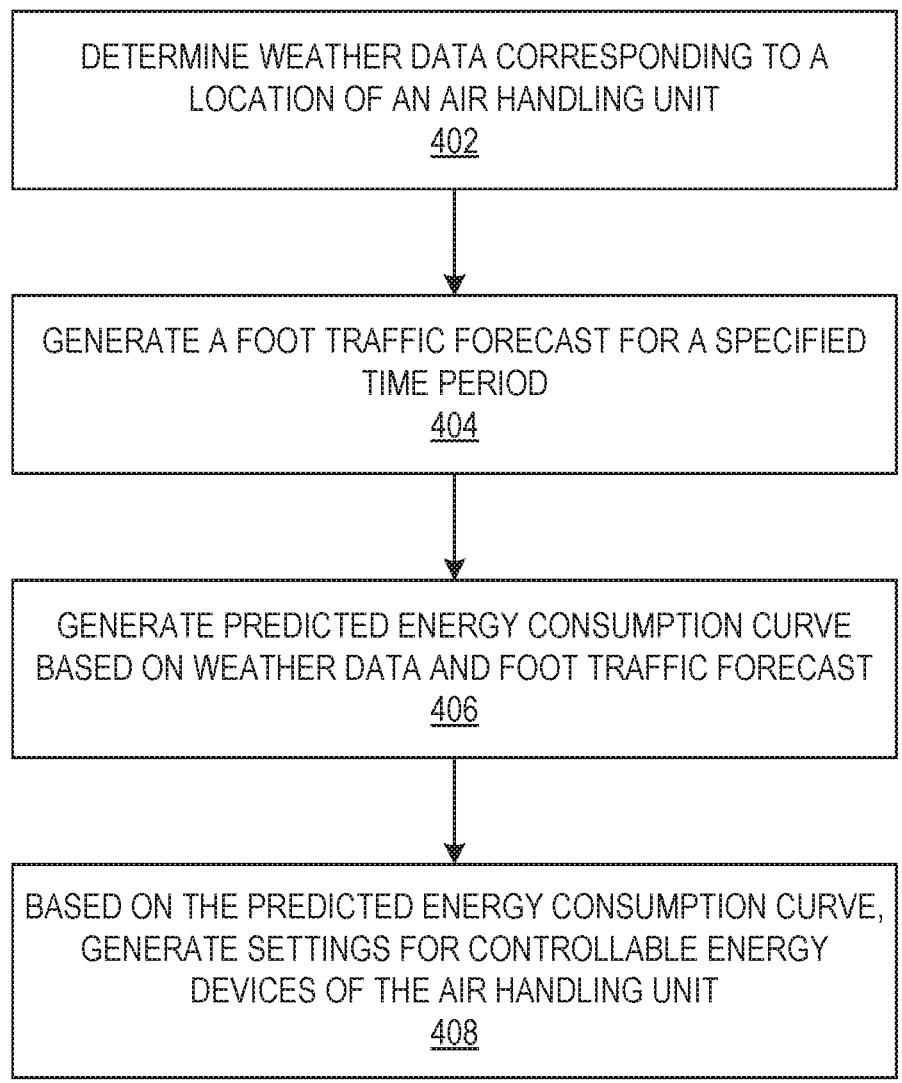
FIGS. 4 and 5 are flow charts each illustrating aspects of a method, according to some example embodiments.

FIG. 4 is a flow chart illustrating aspects of a method 400 for generating settings for an air handling unit for a specified time period (e.g., the next day or a specified date), according to some example embodiments. For illustrative purposes, method 400 is described with respect to the networked system 100 of FIG. 1. It is to be understood that method 400 may be practiced with other system configurations in other embodiments.

In operation 402, a server system (e.g., server system 102 or predictive air handling system 124) determines weather data (e.g., a weather forecast) corresponding to a location of an air handling unit for a building. For example, the server system accesses one or more databases 126 or other data source(s) to retrieve a weather forecast for a predetermined time period (e.g., 24 hours, 36 hours of the specified time period) corresponding to the location (e.g., Milpitas, Calif.) of the building in which the air handling unit resides. The weather data may comprise temperature data for the predetermined period of time, such as a temperature for every minute or hour (for example) of the predetermined period of time. The predetermined time period may be specified by a user or administrator associated with the air handling unit, a developer of the predictive air handling system 124, or the like.

In operation 404, the server system generates a foot traffic forecast for the specified time period (e.g., a given day such as the next day) in the building. The specified time period may be specified by a user or administrator associated with the air handling unit, specified by a developer of the predictive air handling system 124, or the like. Foot traffic generally indicates the presence and movement of people inside a building or other space. In example embodiments, a foot traffic forecast refers to a number of people anticipated to be present in the building during the specified time period (e.g., the next day or 24 hour period) or during particular intervals of the specified time period (e.g., each hour, every 15 minutes, in the morning, afternoon, and evening, etc.). In addition to the weather forecast for the specified time period, foot traffic in the building for the specified time period can also determine how much energy is needed for the day. For example, the more people in the building, the more energy is needed for cooling, and the higher chance for reaching unsafe levels of carbon dioxide. In one example, the foot traffic forecast is an hourly foot traffic forecast. In other examples, other time intervals can be used (e.g., every half hour, every 15 minutes, every 3 hours, etc.). A total foot traffic for the day can be determined by adding up all the forecasted foot traffic values (e.g., hourly) for the day. In one example, historical foot traffic data can be gathered up to the point of prediction (e.g., specified time period) and used to generate the foot traffic forecast.

External factors, such as holidays (e.g., national and local holidays) and building events affect foot traffic and are included as external variables for a machine learning model to forecast foot traffic. In one example, the machine learning model uses historical foot traffic data, holidays relevant to the region/location of the air handling unit, and internal building events. It is to be understood that less, more, or other external factors may be used in other examples. In one example, the machine learning algorithm used is the Autoregressive Integrated Moving Average with Exogenous Variables (ARIMAX), with the foot traffic as the target variable, and the holidays and building events as the exogenous variables. In one example, parameters of the ARIMAX model are chosen using the Hyndman-Khandakar algorithm implemented in open-source Python library called Pyramid.

The machine learning model forecasts the foot traffic for the specified time period (e.g., the next day i+1). The output of the machine learning model is the number of people per hour (or other time interval) for the specified time period. Once the true foot traffic for the next day is known, a fresh model is trained when forecasting foot traffic for day i+2. In one example, the model forecasts foot traffic for at most one day in advance.

In operation 406, the server system generates a predicted energy consumption curve based on the weather forecast and generated foot traffic forecast for the specified time period. The method of generating a predicted energy consumption curve is described in reference to the flow chart in FIG. 5.

Figure 5:
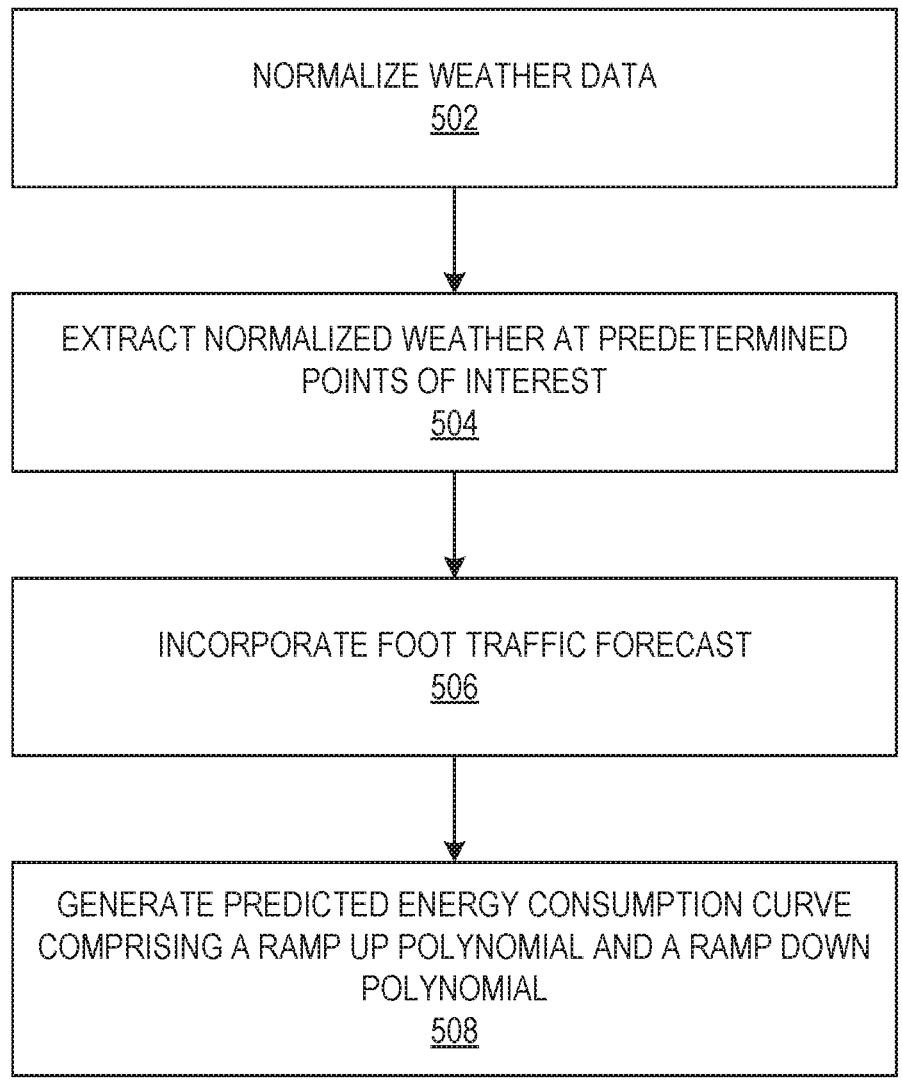

FIG. 5 is a flow chart illustrating aspects of a method 500 for generating a predicted energy consumption curve, according to some example embodiments. For illustrative purposes, method 500 is described with respect to the networked system 100 of FIG. 1. It is to be understood that method 500 may be practiced with other system configurations in other embodiments.

In operation 502, the server system normalizes the weather data (e.g., weather forecast). For example, the server system normalizes the weather data to comprise values between 0 and 1 (e.g., instead of temperature values) based on historical minimum and maximum temperatures for the location of the air handling unit (e.g., using a minmax normalization). The purpose of this is to generate values to use for device settings (which are typically between 0 and 100%/o) instead of temperature values. Using a specific example, a historical minimum temperature may be 25 degrees Celsius and a historical maximum temperature may be 50 degrees Celsius. If the forecast for a given time interval within the weather data (e.g., at noon) is 40 degrees Celsius, then in one example, the temperature of 40 degrees would be normalized by performing a min-max normalization (e.g., (value-min)/(max-min)) by calculating (40-25)/(50-25). In one example, a formula for this calculation is (forecasted temperature-min(historical temperature))/(max (historical temperature)-min(historical temperature)). All the temperature data of the weather data (e.g., for predetermined time intervals, such as hourly intervals) may be normalized, or the temperature data may only be normalized for predetermined points of interest (e.g., for an opening time for a building, a time of a peak outside air temperature, a closing time for the building, etc.).

In operation 504, the server system extracts normalized weather for predetermined points of interest. In one example, predetermined points of interest comprise an opening time of the building, a peak outside air temperature (e.g., indicated by the weather data or normalized weather data), a peak foot traffic (e.g., based on the generated foot traffic forecast), a closing time of the building, and so forth. In one example, the server system extracts normalized weather data for the opening time of the building, a peak outside air temperature, and a closing time of the building.

In operation 506, the server system incorporates the generated foot traffic forecast (e.g., described above with respect to operation 404 of FIG. 4). For example, from the generated foot traffic forecast, the server system calculates the peak foot traffic and the hour in which it occurs. If the peak foot traffic occurs before the temperature peak for the day, then the foot traffic point is used for a ramp-up polynomial (described in further detail below); otherwise the foot traffic point is used for the ramp-down polynomial (described in further detail below).

The server system obtains a percentile of foot traffic forecast compared to the historical foot traffic for that day (e.g., Thursday foot traffic forecast is compared to all historical Thursdays). The percentile is used to scale a y-value of a third point of the energy consumption curve. For example, for a temperature peak at 12:00 pm with a scaled value of 0.95, a foot traffic peak at 1:00 pm with a percentile value of 0.8 (and since foot traffic peak occurs after the temperature peak, the foot traffic peak will be used in the ramp down curve in this example), and a 11:00 pm (e.g., building closing time) scaled value of 0.4, the foot traffic y value is calculated: (0.95−0.4)*0.8+0.4=0.84. In this example, the three values used for the polynomial fitting (described in further detail below) are (12, 0.95), (13, 0.84), and (23, 0.4).

In operation 508, the server system generates the predicted energy consumption curve comprising a ramp-up polynomial and a ramp-down polynomial. For example, the server system generates the predicted (or recommended) energy consumption graph by fitting a polynomial from a first predetermined point of interest (e.g., an opening time of the building) to a second predetermined point of interest (e.g., weather peak) to generate a ramp-up polynomial, and by fitting a polynomial from the weather peak to a second predetermined point of interest (e.g., a closing time of the building) to generate a ramp-down polynomial. For the ramp-up polynomial, the order of the polynomial is proportional to the area under the normalized weather data from the first predetermined point of interest to the weather peak. For the ramp-down polynomial, the order of the polynomial is fixed.

Figure 6:
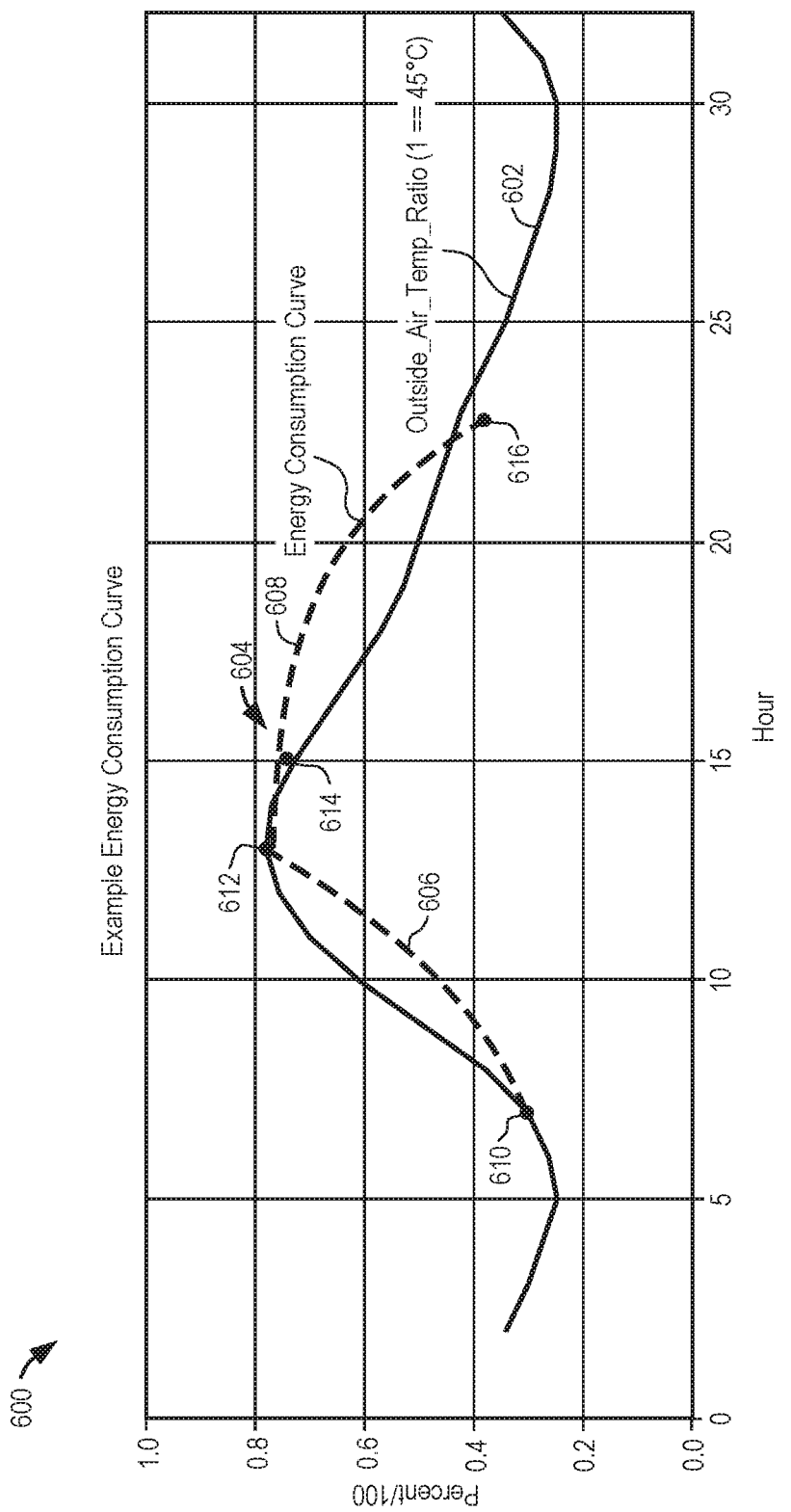
FIG. 6 illustrates an example predicted energy consumption curve for a given day, according to some example embodiments.

An example predicted energy consumption curve for a given day is shown in the diagram 600 of FIG. 6. The first curve 602 is the normalized weather forecast and the second curve 604 is the energy consumption curve comprising the ramp-up polynomial 606 and the ramp-down polynomial 608 with the four points of interest 610-616. The point of interest 610 is the opening time of the building, the point of interest 612 is the peak temperature, the point of interest 614 is the peak foot traffic, and the point of interest 616 is the close time of the building. The resolution in this example is five minutes.

Returning to FIG. 4, in operation 408, the server system generates settings for the air handling unit, based on the predicted energy consumption curve. In one example, the server system generates settings for one or more controllable energy devices of the air handling unit, based on the predicted energy consumption curve. As explained above, the controllable energy device may comprise significant energy consuming devices and non-significant energy consuming devices.

To generate settings for significant energy consuming devices (e.g., cooling coil valve, supply air fan, and exhaust air fan), the server system calculates cost coefficients of each fan and cooler from each device's cost per kilowatt-hour. The cost per kilowatt-hour can be obtained by the server system from input via a client device 110, via a third-party server 130, by accessing cost data in one or more database(s) 126, or other system or data source. The server system generates the fan device settings using a similar ramp-up and ramp-down polynomial as explained above and using the points of interest including an allowable minimum fan speed and an allowable maximum fan speed. These allowable minimum and maximum fan speeds can be set by a user of the air handling unit 200 or predictive air handling system 124. For example, if the minimum fan setting is 0.3 (or 30%) and the maximum fan setting is 0.9 (or 90%), the server system fits a polynomial from 0.3 to 0.9 to generate the ramp-up polynomial of a curve and fits a polynomial from 0.9 to 0.3 to generate the ramp-down polynomial of a curve (e.g., curve 704 of FIG. 7, described below). In one example, the minimum and maximum fan settings are configurable (e.g., to be set between 0 and 1).

The server system generates or calculates the cooler device settings using the fan device settings, recommended energy consumption and fan device and cooler device coefficients. For example: cooler device settings=(recommended energy−fan coefficient*fan settings)/cooler coefficient. In one example, the settings for the exhaust air fan and supply air fan are identical. In one example, the settings are values in the range of [0-100] which represent the percentage of fan speed or cooling coil value position. In one example the time interval for the settings can be set by a user of the air handling unit 200 or predictive air handling system 124.

Figure 7:
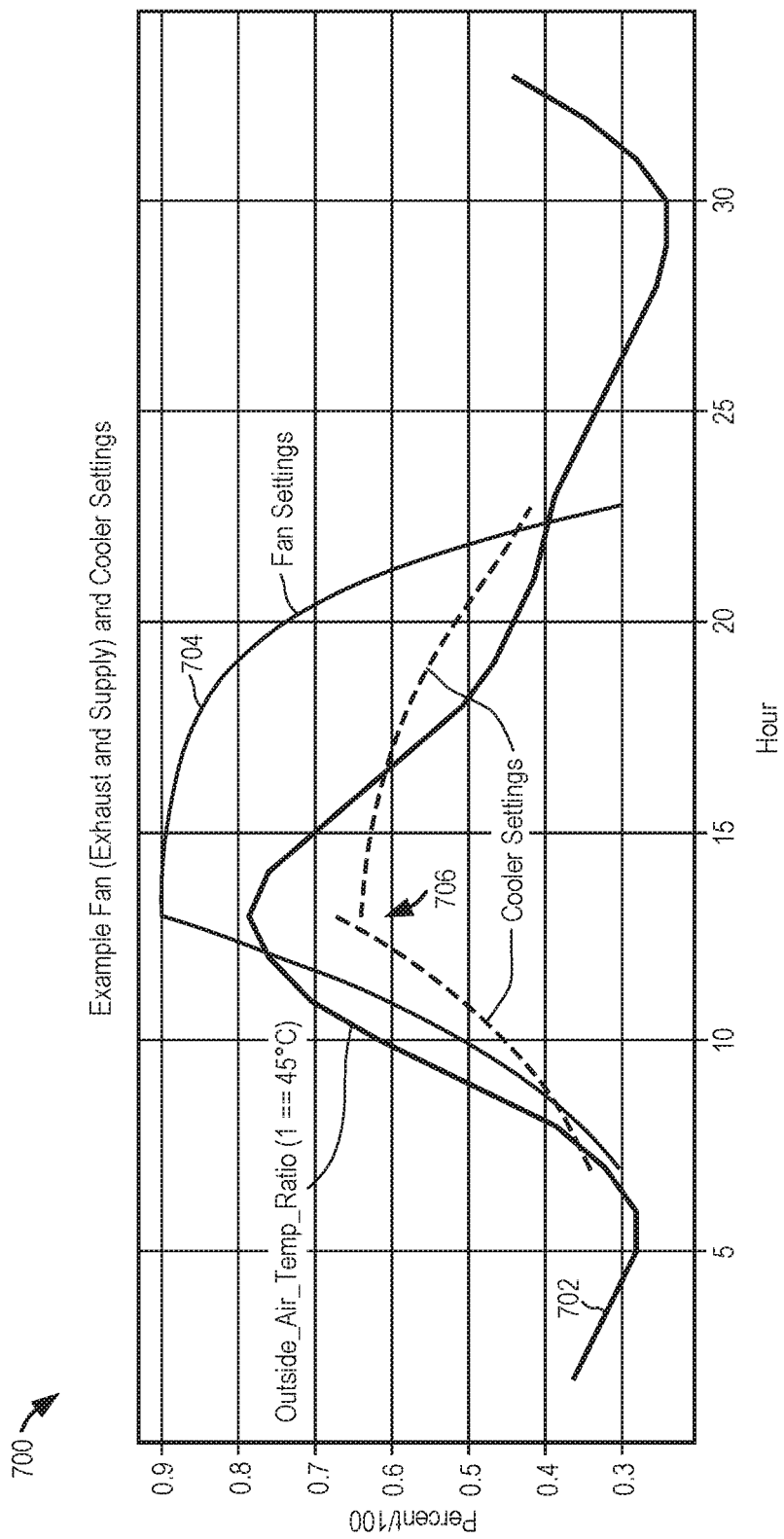
FIG. 7 illustrates example generated fan and cooler device settings, according to some example embodiments.

Example fan and cooler device settings are shown in the diagram 700 of FIG. 7. In the diagram 700, the curve 702 represents the outside air temperature ratio (e.g., 1=45 degrees Celsius), the curve 704 represents the fan settings, and curve 706 represents the cooler settings. The x-axis in the diagram 700 is the hours and the y-axis is the maximum allowable fan settings (which may be specified by a user). Using the fan settings curve 704, the minimum fan settings is 0.3 (or 30%) and the maximum fan settings is 0.9 (or 90%). Thus, the server system fits a polynomial from 0.3 to 0.9 to generate the ramp-up polynomial of the curve 704 and fits a polynomial from 0.9 to 0.3 to generate the ramp-down polynomial of the curve 704.

The server system also generates settings for non-significant energy consuming devices (e.g., dampers such as the exhaust air damper, fresh air damper, and mixed air damper). The goal of such non-significant energy consuming devices is to control how much air to circulate within the building, and how much air to incorporate from outside. Damper operations depend on a number of factors. One factor is the outside air temperature. If it is hot outside, then allowing the fresh air damper to be open will cause the hot outside air to mix with the cool internal air and cause the internal temperature to rise. In this case, the fresh air damper should be closed. Alternatively, if the outside air is cool, then incorporating cool air will generate "free" cooling for the building. Another factor is foot traffic. For example, carbon dioxide builds up as more people visit the building and so the fresh air damper should be modulated to prevent critical levels of carbon dioxide in the building.

The server system controls the dampers based on the outside air temperature (e.g., weather data or forecast). For example, in the summer months when the outside air temperature is high, the fresh air damper is kept fully closed and the mixed air damper is kept fully open to force the internal air to circulate. In one example a threshold temperature is specified for when a damper should be kept fully closed or fully open. For example, a threshold may be 24 degrees Celsius; thus, when the outside temperature is greater than 24 degrees Celsius, the damper is kept fully closed, and if the temperature is less than 24 degrees Celsius, the damper is kept fully open. The foot traffic forecast is compared with historical foot traffic for that day. If the forecast is above a certain percentile, then the fresh air damper is set to be fully open during the time the outside air temperature is at its minimum. How long the damper is open is dependent on the air handling unit. In one example the fresh air damper and the exhaust damper settings are the same.

Figure 8:
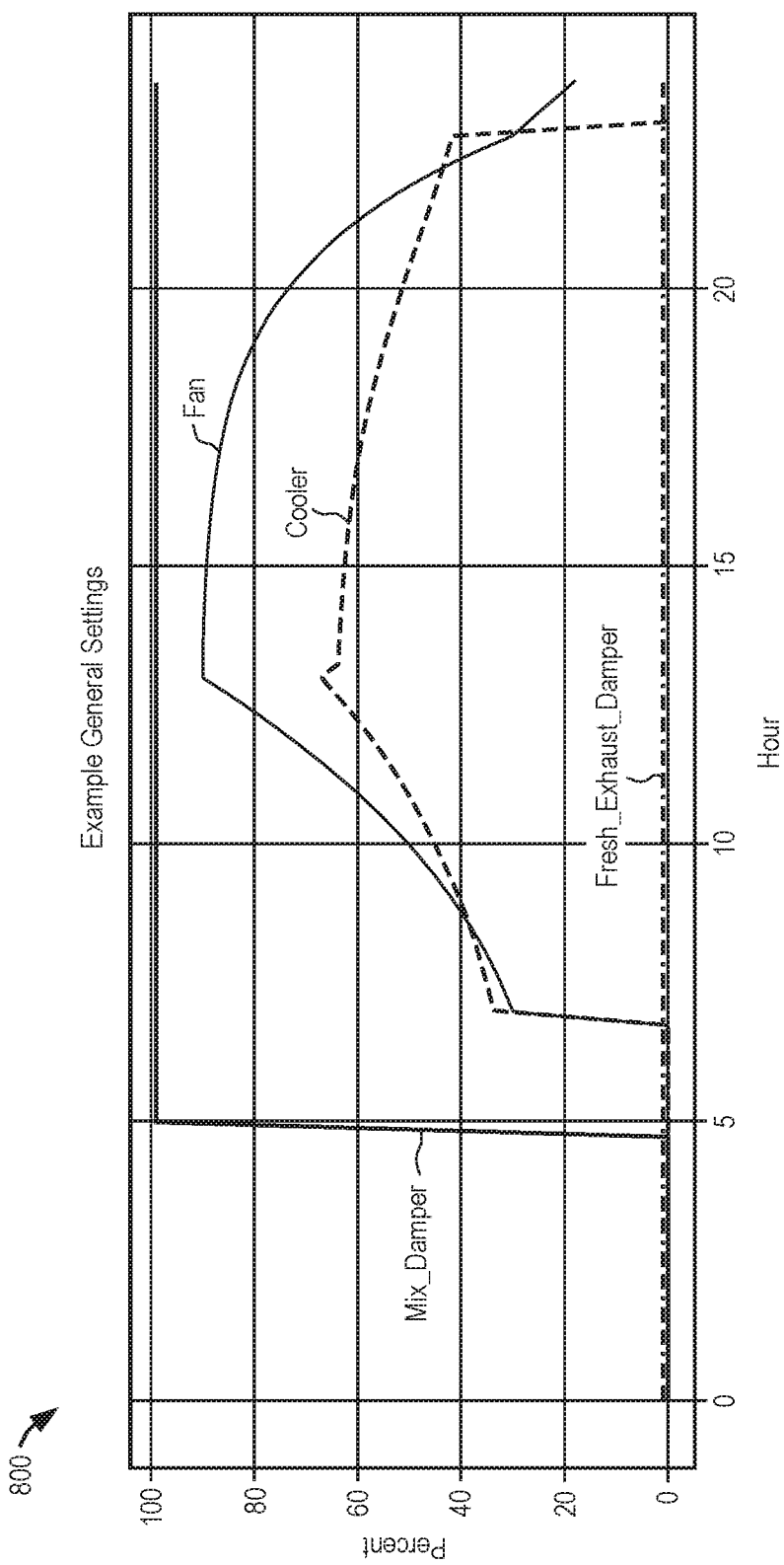
FIG. 8 illustrates example generated settings for an air handling unit, according to some example embodiments.

In one example, the generated settings for the air handling unit comprise the generated settings for the significant energy consuming devices and the non-significant energy consuming devices. FIG. 8 is a diagram 800 illustrating the generated settings for the air handling unit including settings for a fan, cooler, fresh air and exhaust air damper, and mix damper.

The server system may then provide the generated settings for the air handling unit to control the air handling unit for the specified time period (e.g., the next day). In one example, the server system interacts with the air handling unit (e.g., via an API of the air handling unit) to adjust the settings of the air handling unit according to the generated settings. In another example, the server system provides the generated settings to one or more client devices 110 or third-party system 130 to control the air handling unit according to the generate settings.

The following examples describe various embodiments of methods, machine-readable media, and systems (e.g., machines, devices, or other apparatus) discussed herein.

Example 1. A computer-implemented method comprising:
determining, by a server system, a weather forecast corresponding to a location of an air handling unit for a building;
generating, by the server system, a foot traffic forecast for a specified time period in the building;
generating, by the server system, a predicted energy consumption curve based on the weather forecast and generated foot traffic forecast for the specified time period;
based on the predicted energy consumption curve, generating settings for controllable energy devices of the air handling unit, and
providing the generated settings to the air handling unit to control the air handling unit for the specified time period.

Example 2. A method according to any of the previous examples, wherein determining the weather forecast comprises accessing weather data for the location associated with the air handling unit.

Example 3. A method according to any of the previous examples, wherein generating the predicted energy consumption curve comprises:
normalizing the weather data to comprise values between 0 and 1 based on historical minimum and maximum temperatures for the location of the air handling unit;
extracting the normalized weather data at predetermined points of interest;
incorporating the generated foot traffic forecast; and
generating the predicted energy consumption curve by fitting a polynomial from a first predetermined point of interest of the predetermined points of interest to a weather peak based on the normalized weather data to generate a ramp-up polynomial, and by fitting a polynomial from the weather peak to a second predetermined point of interest of the predetermined points of interest to generate a ramp-down polynomial.

Example 4. A method according to any of the previous examples, wherein for the ramp-up polynomial, the order of the polynomial is proportional to an area under the normalized weather data from the first predetermined point of interest to the weather peak.

Example 5. A method according to any of the previous examples, wherein for the ramp-down polynomial, the order of the polynomial is fixed.

Example 6. A method according to any of the previous examples, wherein the predetermined points of interest comprise an opening time of the building, a peak outside air temperature indicated by the normalized weather data, a peak foot traffic, and a closing time of the building.

Example 7. A method according to any of the previous examples, wherein generating the foot traffic forecast is based on at least one of historical foot traffic data, holiday data, and building event data.

Example 8. A method according to any of the previous examples, wherein the controllable devices comprise significant energy consuming devices and non-significant energy consuming devices.

Example 9. A method according to any of the previous examples, wherein generating settings for the significant energy consuming devices of the air handling unit comprises:
calculating each significant energy consuming device cost per kilowatt-hour;
generating fan device settings using ramp-up and ramp-down polynomials based on points of interest including an allowable minimum fan speed and an allowable maximum fan speed; and
generating cooler device settings using the fan device settings, recommended energy consumption, and fan device and cooler device coefficients.

Example 10. A method according to any of the previous examples, wherein generating settings for the non-significant energy consuming devices of the air handling unit is based on the weather forecast corresponding to the location of the air handling unit.

Example 11. A system comprising:
a memory that stores actions; and
one or more processors configured by the actions to perform operations comprising:
determining a weather forecast corresponding to a location of an air handling unit for a building;
generating a foot traffic forecast for a specified time period in the building;
generating a predicted energy consumption curve based on the weather forecast and generated foot traffic forecast for the specified time period;
based on the predicted energy consumption curve, generating settings for controllable energy devices of the air handling unit; and
providing the generated settings to the air handling unit to control the air handling unit for the specified time period.

Example 12. A system according to any of the previous examples, wherein determining the weather forecast comprises accessing weather data for the location associated with the air handling unit.

Example 13. A system according to any of the previous examples, wherein generating the predicted energy consumption curve comprises:
normalizing the weather data to comprise values between 0 and 1 based on historical minimum and maximum temperatures for the location of the air handling unit;
extracting the normalized weather data at predetermined points of interest;
incorporating the generated foot traffic forecast; and
generating the predicted energy consumption curve by fitting a polynomial from a first predetermined point of interest of the predetermined points of interest to a weather peak based on the normalized weather data to generate a ramp-up polynomial, and by fitting a polynomial from the weather peak to a second predetermined point of interest of the predetermined points of interest to generate a ramp-down polynomial.

Example 14. A system according to any of the previous examples, wherein for the ramp-up polynomial, the order of the polynomial is proportional to an area under the normalized weather data from the first predetermined point of interest to the weather peak.

Example 15. A system according to any of the previous examples, wherein for the ramp-down polynomial, the order of the polynomial is fixed.

Example 16. A system according to any of the previous examples, wherein the points of interest comprise an opening time of the building, a peak outside air temperature indicated by the normalized weather data, a peak foot traffic, and a closing time of the building.

Example 17. A system according to any of the previous examples, wherein generating the foot traffic forecast is based on at least one of historical foot traffic data, holiday data, and building event data.

Example 18. A system according to any of the previous examples, wherein the controllable devices comprise significant energy consuming devices and non-significant energy consuming devices.

Example 19. A system according to any of the previous examples, wherein generating settings for the significant energy consuming devices of the air handling unit comprises:

calculating each significant energy consuming device cost per kilowatt-hour;

generating fan device settings using ramp-up and ramp-down polynomials based on points of interest including an allowable minimum fan speed and an allowable maximum fan speed; and generating cooler device settings using the fan device settings, recommended energy consumption, and fan device and cooler device coefficients.

Example 20. A non-transitory computer-readable medium comprising actions stored thereon that are executable by at least one processor to cause a computing device to perform operations comprising:

determining a weather forecast corresponding to a location of an air handling unit for a building;

generating a foot traffic forecast for a specified time period in the building;

generating a predicted energy consumption curve based on the weather forecast and generated foot traffic forecast for the specified time period;

based on the predicted energy consumption curve, generating settings for controllable energy devices of the air handling unit; and providing the generated settings to the air handling unit to control the air handling unit for the specified time period.

Figure 9:
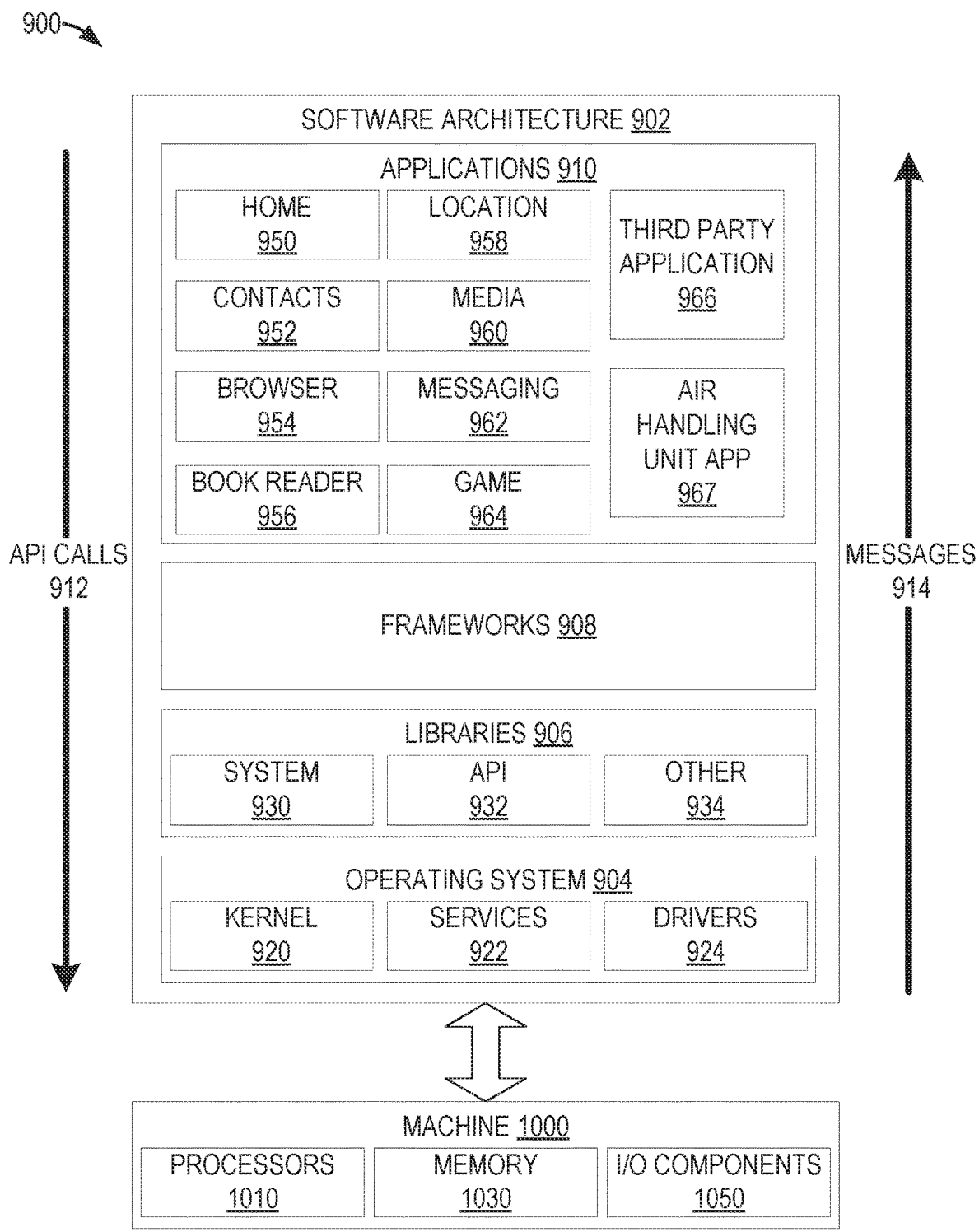
FIG. 9 is a block diagram illustrating an example of a software architecture that may be installed on a machine, according to some example embodiments.

FIG. 9 is a block diagram 900 illustrating software architecture 902, which can be installed on any one or more of the devices described above. For example, in various embodiments, client devices 110 and servers and systems 130, 102, 120, 122, and 124 may be implemented using some or all of the elements of software architecture 902. FIG. 9 is merely a non-limiting example of a software architecture, and it will be appreciated that many other architectures can be implemented to facilitate the functionality described herein. In various embodiments, the software architecture 902 is implemented by hardware such as machine 1000 of FIG. 10 that includes processors 1010, memory 1030, and I/O components 1050. In this example, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke application programming interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphic user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Some embodiments may particularly include an air handling unit application 967. In certain embodiments, this may be a stand-alone application that operates to manage communications with a server system such as third-party servers 130 or server system 102. In other embodiments, this functionality may be integrated with another application. The air handling unit application 967 may request and display various data related to generating recommended settings for one or more air handling units and control of one or more air handling units, and may provide the capability for a user 106 to input data related to the objects via a touch interface, keyboard, or using a camera device of machine 1000, communication with a server system via I/O components 1050, and receipt and storage of object data in memory 1030. Presentation of information and user inputs associated with the information may be managed by air handling unit application 967 using different frameworks 908, library 906 elements, or operating system 904 elements operating on a machine 1000.

Figure 10:
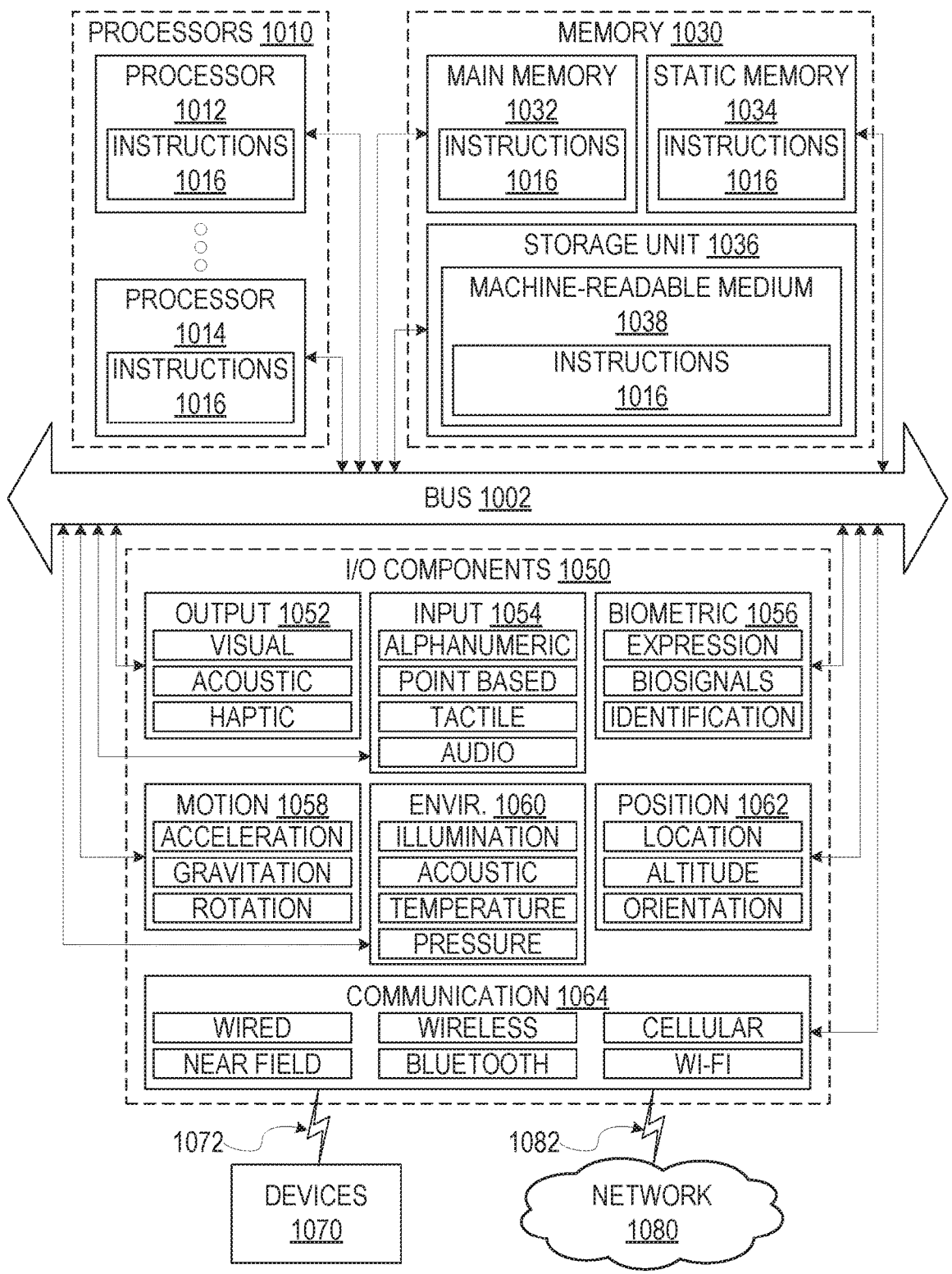
FIG. 10 illustrates a diagrammatic representation of a machine, in the form of a computer system, within which a set of instructions may be executed for causing the machine to perform any one or more of the methodologies discussed herein, according to an example embodiment.

FIG. 10 is a block diagram illustrating components of a machine 1000, according to some embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1016 (e.g., software, a program, an application 910, an applet, an app, or other executable code) for causing the machine 1000 to perform any one or more of the methodologies discussed herein can be executed. In alternative embodiments, the machine 1000 operates as a standalone device or can be coupled (e.g., networked) to other machines. In a networked deployment, the machine 1000 may operate in the capacity of a server machine 130, 102, 120, 122, 124, etc., or a client device 110 in a server-client network environment, or as a peer machine in a peer-to-peer (or distributed) network environment. The machine 1000 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

In various embodiments, the machine 1000 comprises processors 1010, memory 1030, and I/O components 1050, which can be configured to communicate with each other via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1012 and a processor 1014 that may execute the instructions 1016. The term "processor" is intended to include multi-core processors 1010 that may comprise two or more independent processors 1012, 1014 (also referred to as "cores") that can execute instructions 1016 contemporaneously. Although FIG. 10 shows multiple processors 1010, the machine 1000 may include a single processor 1010 with a single core, a single processor 1010 with multiple cores (e.g., a multi-core processor 1010), multiple processors 1012, 1014 with a single core, multiple processors 1012, 1014 with multiples cores, or any combination thereof.

The memory 1030 comprises a main memory 1032, a static memory 1034, and a storage unit 1036 accessible to the processors 1010 via the bus 1002, according to some embodiments. The storage unit 1036 can include a machine-readable medium 1038 on which are stored the instructions 1016 embodying any one or more of the methodologies or functions described herein. The instructions 1016 can also reside, completely or at least partially, within the main memory 1032, within the static memory 1034, within at least one of the processors 1010 (e.g., within the processor's cache memory), or any suitable combination thereof, during execution thereof by the machine 1000. Accordingly, in various embodiments, the main memory 1032, the static memory 1034, and the processors 1010 are considered machine-readable media 1038.

As used herein, the term "memory" refers to a machine-readable medium 1038 able to store data temporarily or permanently and may be taken to include, but not be limited to, random-access memory (RAM), read-only memory (ROM), buffer memory, flash memory, and cache memory. While the machine-readable medium 1038 is shown, in an example embodiment, to be a single medium, the term "machine-readable medium" should be taken to include a single medium or multiple media (e.g., a centralized or distributed database, or associated caches and servers) able to store the instructions 1016. The term "machine-readable medium" shall also be taken to include any medium, or combination of multiple media, that is capable of storing instructions (e.g., instructions 1016) for execution by a machine (e.g., machine 1000), such that the instructions 1016, when executed by one or more processors of the machine 1000 (e.g., processors 1010), cause the machine 1000 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1050 include a wide variety of components to receive input, provide output, produce output, transmit information, exchange information, capture measurements, and so on. In general, it will be appreciated that the I/O components 1050 can include many other components that are not shown in FIG. 10. The I/O components 1050 are grouped according to functionality merely for simplifying the following discussion, and the grouping is in no way limiting. In various example embodiments, the I/O components 1050 include output components 1052 and input components 1054. The output components 1052 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1054 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 1050 include biometric components 1056, motion components 1058, environmental components 1060, or position components 1062, among a wide array of other components. For example, the biometric components 1056 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1058 include acceleration sensor components (e.g., accelerometer), gravitation sensor components, rotation sensor components (e.g., gyroscope), and so forth. The environmental components 1060 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1062 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 include a network interface component or another suitable device to interface with the network 1080. In further examples, communication components 1064 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1070 may be another machine 1000 or any of a wide variety of peripheral devices (e.g., a peripheral device coupled via a Universal Serial Bus (USB)).

Moreover, in some embodiments, the communication components 1064 detect identifiers or include components operable to detect identifiers. For example, the communication components 1064 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1064, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1080 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1016 are transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, in other example embodiments, the instructions 1016 are transmitted or received using a transmission medium via the coupling 1072 (e.g., a peer-to-peer coupling) to the devices 1070. The term "transmission medium" shall be taken to include any intangible medium that is capable of storing, encoding, or carrying the instructions 1016 for execution by the machine 1000, and includes digital or analog communications signals or other intangible media to facilitate communication of such software.

Furthermore, the machine-readable medium 1038 is non-transitory (in other words, not having any transitory signals) in that it does not embody a propagating signal. However, labeling the machine-readable medium 1038 "non-transitory" should not be construed to mean that the medium is incapable of movement; the medium 1038 should be considered as being transportable from one physical location to another. Additionally, since the machine-readable medium 1038 is tangible, the medium 1038 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   determining, by a server system, a weather forecast comprising weather data corresponding to a location of an air handling unit for a building;
   generating, by the server system, a foot traffic forecast for a specified time period in the building;
   generating, by the server system, a predicted energy consumption curve based on the weather forecast and generated foot traffic forecast for the specified time period, by performing operations comprising:
      normalizing the weather data based on historical minimum and maximum temperatures for the location of the air handling unit;
      extracting the normalized weather data at predetermined points of interest;
      incorporating the generated foot traffic forecast; and
      generating the predicted energy consumption curve by fitting a polynomial from a first predetermined point of interest of the predetermined points of interest to a weather peak based on the normalized weather data to generate a ramp-up polynomial, and by fitting a polynomial from the weather peak to a second predetermined point of interest of the predetermined points of interest to generate a ramp-down polynomial;
   based on the predicted energy consumption curve, generating settings for controllable energy devices of the air handling unit; and
   providing the generated settings to the air handling unit to control the air handling unit for the specified time period.

2. The method of claim 1, wherein
the weather data is normalized to comprise values between 0 and 1 based on the historical minimum and maximum temperatures for the location of the air handling unit.

3. The method of claim 2, wherein for the ramp-up polynomial, the order of the polynomial is proportional to an area under the normalized weather data from the first predetermined point of interest to the weather peak.

4. The method of claim 2, wherein for the ramp-down polynomial, the order of the polynomial is fixed.

5. The method of claim 2, wherein the predetermined points of interest comprise an opening time of the building, a peak outside air temperature indicated by the normalized weather data, a peak foot traffic, and a closing time of the building.

6. The method of claim 1, wherein generating the foot traffic forecast is based on at least one of historical foot traffic data, holiday data; and building event data.

7. The method of claim 1, wherein the controllable devices comprise significant energy consuming devices and non-significant energy consuming devices.

8. The method of claim 7, wherein generating settings for the significant energy consuming devices of the air handling unit comprises:
   calculating each significant energy consuming device cost per kilowatt-hour;
   generating fan device settings using ramp-up and ramp-down polynomials based on points of interest including an allowable minimum fan speed and an allowable maximum fan speed; and
   generating cooler device settings using the fan device settings, recommended energy consumption, and fan device and cooler device coefficients.

9. The method of claim 7, wherein generating settings for the non-significant energy consuming devices of the air handling unit is based on the weather forecast corresponding to the location of the air handling unit.

10. A system comprising:
    a memory that stores actions; and one or more processors configured by the actions to perform operations comprising:

determining a weather forecast comprising weather data corresponding to a location of an air handling unit for a building;

generating a foot traffic forecast for a specified time period in the building;

generating a predicted energy consumption curve based on the weather forecast and generated foot traffic forecast for the specified time period, by performing operations comprising:

normalizing the weather data based on historical minimum and maximum temperatures for the location of the air handling unit;

extracting the normalized weather data at predetermined points of interest;

incorporating the generated foot traffic forecast; and generating the predicted energy consumption curve by fitting a polynomial from a first predetermined point of interest of the predetermined points of interest to a weather peak based on the normalized weather data to generate a ramp-up polynomial, and by fitting a polynomial from the weather peak to a second predetermined point of interest of the predetermined points of interest to generate a ramp-down polynomial;

based on the predicted energy consumption curve, generating settings for controllable energy devices of the air handling unit; and providing the generated settings to the air handling unit to control the air handling unit for the specified time period.

11. The system of claim 10, wherein
the weather data is normalized to comprise values between 0 and 1 based on the historical minimum and maximum temperatures for the location of the air handling unit.

12. The system of claim 11, wherein for the ramp-up polynomial, the order of the polynomial is proportional to an area under the normalized weather data from the first predetermined point of interest to the weather peak.

13. The system of claim 11, wherein for the ramp-down polynomial, the order of the polynomial is fixed.

14. The system of claim 11, wherein the points of interest comprise an opening time of the building, a peak outside air temperature indicated by the normalized weather data, a peak foot traffic, and a closing time of the building.

15. The system of claim 10, wherein generating the foot traffic forecast is based on at least one of historical foot traffic data, holiday data, and building event data.

16. The system of claim 10, wherein the controllable devices comprise significant energy consuming devices and non-significant energy consuming devices.

17. The system of claim 16, wherein generating settings for the significant energy consuming devices of the air handling unit comprises:

calculating each significant energy consuming device cost per kilowatt-hour;

generating fan device settings using ramp-up and ramp-down polynomials based on points of interest including an allowable minimum fan speed and an allowable maximum fan speed; and generating cooler device settings using the fan device settings, recommended energy consumption, and fan device and cooler device coefficients.

18. A non-transitory computer-readable medium comprising actions stored thereon that are executable by at least one processor to cause a computing device to perform operations comprising:

determining a weather forecast comprising weather data corresponding to a location of an air handling unit for a building;

generating a foot traffic forecast for a specified time period in the building;

generating a predicted energy consumption curve based on the weather forecast and generated foot traffic forecast for the specified time period, by performing operations comprising:

normalizing the weather data based on historical minimum and maximum temperatures for the location of the air handling unit;

extracting the normalized weather data at predetermined points of interest;

incorporating the generated foot traffic forecast; and generating the predicted energy consumption curve by fitting a polynomial from a first predetermined point of interest of the predetermined points of interest to a weather peak based on the normalized weather data to generate a ramp-up polynomial and by fitting a polynomial from the weather peak to a second predetermined point of interest of the predetermined points of interest to generate a ramp-down polynomial;

based on the predicted energy consumption curve, generating settings for controllable energy devices of the air handling unit; and providing the generated settings to the air handling unit to control the air handling unit for the specified time period.

19. The non-transitory computer-readable medium of claim 18, wherein for the ramp-up polynomial, the order of the polynomial is proportional to an area under the normalized weather data from the first predetermined point of interest to the weather peak.

20. The non-transitory computer-readable medium of claim 18, wherein for the ramp-down polynomial, the order of the polynomial is fixed.

* * * * *